US008458779B2

United States Patent
Valentine et al.

(10) Patent No.: US 8,458,779 B2
(45) Date of Patent: Jun. 4, 2013

(54) SYSTEM AND METHOD FOR HANDLING PERSONAL IDENTIFICATION INFORMATION

(75) Inventors: Eric Lee Valentine, Plano, TX (US); Inayat Syed, Richardson, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 352 days.

(21) Appl. No.: 12/819,623

(22) Filed: Jun. 21, 2010

(65) Prior Publication Data

US 2011/0314526 A1    Dec. 22, 2011

(51) Int. Cl.
*H04L 29/06* (2006.01)

(52) U.S. Cl.
USPC .............................................. 726/6; 713/186

(58) Field of Classification Search
USPC ............................................... 726/6; 713/186
See application file for complete search history.

(56) References Cited

U.S. PATENT DOCUMENTS

| 6,496,595 | B1 * | 12/2002 | Puchek et al. | 382/124 |
| 2002/0025062 | A1 * | 2/2002 | Black | 382/116 |
| 2006/0206722 | A1 * | 9/2006 | Zhang | 713/186 |
| 2012/0199653 | A1 * | 8/2012 | Wenzel | 235/382 |

FOREIGN PATENT DOCUMENTS

| EP | 1821262 A2 | 8/2007 |
| EP | 1881461 A2 | 1/2008 |
| WO | WO 98/41947 A1 | 9/1998 |
| WO | WO 9841947 | * 9/1998 |

* cited by examiner

*Primary Examiner* — Jason Gee (57) ABSTRACT

A system, method, and client registration and verification device for handling personal identification information. The client device collects from an individual, a sufficient amount of biometric information to uniquely identify the individual, as well as historical mobility information providing a history of locations where the individual has lived. A caching manager stores the collected biometric information at a selected cache node in a hierarchical database having a plurality of cache nodes at multiple levels of the database. The caching manager selects the cache node based on the historical mobility information collected from the individual. The client device sends subsequent requests to verify the identity of the individual to a local cache node where newly input biometric information is compared with the cached information. When the individual's biometric information is not stored in the local cache node, the request is forwarded upward in the database until the cached information is found and compared.

20 Claims, 6 Drawing Sheets

SYSTEM AND METHOD FOR HANDLING PERSONAL IDENTIFICATION INFORMATION

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND

The present invention relates to authentication systems and secure communications networks. More particularly, and not by way of limitation, the present invention is directed to a system and method for securely collecting, storing, retrieving, and verifying personal identification information on a very large, e.g., national scale.

The traditional approach to large-scale data systems would be to build a customized IT-based solution with a central database and a large number of remote clients. Experience has shown, however, that such designs do not scale well and suffer from reliability issues (partly as a side effect of the scaling issue). Bandwidth requirements for retrieval and verification operations utilizing massive amounts of data from a central database would be excessive. Also, retrieval response times from a central database would be unduly long. In addition, centralized solutions tend to suffer from a number of potential security issues such as man-in-the-middle attacks, spoofing, and social engineering vulnerabilities.

SUMMARY

The present invention provides a system and method for securely collecting, storing, retrieving, and verifying personal identification information such as biometric information on a very large, e.g., national scale. In one embodiment, the invention may be implemented as a national identification system suitable for even the world's largest countries in which hundreds of millions or even billions of people are each provided with a Unique Identification Number (UIN) in order to improve the provisioning of citizen services and to enhance public safety.

In one embodiment, the present invention is directed to a method of handling personal identification information. The method includes the steps of collecting by a client registration device, a sufficient amount of biometric information directly from an individual to uniquely identify the individual; collecting by the client registration device, historical mobility information from the individual, the mobility information providing a history of locations where the individual has lived; and storing the collected biometric information at a selected cache node in a hierarchical database having a plurality of cache nodes at multiple levels of the database, wherein the storing step includes selecting the cache node based on the historical mobility information collected from the individual.

In another embodiment, the present invention is directed to a system for handling personal identification information. The system includes a client registration device and an information-caching manager. The client registration device includes a biometric data input mechanism for collecting a sufficient amount of biometric information directly from an individual to uniquely identify the individual; and a demographic data input mechanism for collecting historical mobility information from the individual, the mobility information providing a history of locations where the individual has lived. The caching manager stores the collected biometric information at a selected cache node in a hierarchical database having a plurality of cache nodes at multiple levels of the database. The caching manager selects the cache node based on the historical mobility information collected from the individual.

In another embodiment, the present invention is directed to a client registration and verification device for collecting personal identification information. The client registration device includes a biometric data input mechanism for collecting a sufficient amount of biometric information directly from an individual to uniquely identify the individual; a demographic data input mechanism for collecting historical mobility information from the individual; and a transmitter for transmitting the collected biometric and demographic information over a wired or wireless connection to an external database when the wired or wireless connection is available. The device also includes an internal data storage mechanism for storing the collected biometric and demographic information when the wired or wireless connection is not available; and a network interface controller for detecting when the wired or wireless connection is available, and for controlling the transmitter and the internal data storage mechanism. When the wired or wireless connection becomes available and biometric and demographic information is stored in the internal data storage mechanism, the network interface controller causes the transmitter to automatically transmit the collected biometric and demographic information to the external database.

BRIEF DESCRIPTION OF THE DRAWINGS

In the following section, the invention will be described with reference to exemplary embodiments illustrated in the figures, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

There are unique challenges to implementing a very large scale data management and verification system such as a national identification system, particularly in regions that do not have reliable communications infrastructure. In order to implement a national identification system in countries with populations in the hundreds of millions or even billions of people, an enormous amount of biometric and demographic information must be stored. It is desirable to use biometric information, even though this may result in an estimated 1 Mb of data per person, because the use of biometric information ensures that each individual will receive a unique identification number that can be matched only to that individual. This will result in the requirement to store and readily access several hundred terabytes of information. Due to the shortcomings of traditional IT-based centralized solutions discussed above, the preferred embodiment of the present invention utilizes a system of distributed caching.

The identification system supports two main activities, enrollment and verification. The enrollment process generates an estimated 1 Mb of data per person, which must then be transferred from tens of thousands of sites, including remote kiosks, to a central repository. In the largest countries, with populations over 1 billion people, the verification process is likely to result in more than 100 million database hits per day, with a required average turnaround time measured in seconds. The demographics of some countries may present additional challenges, for instance when hundreds of thousands of small towns and villages are dispersed in areas where communications are intermittent and of poor quality even when functioning.

The present invention addresses these issues through a number of system characteristics. First, uniqueness of the identification process is assured down to the individual level by collecting an adequate amount of biometric information from each individual and generating a unique identification number associated with the collected biometric information. Second, the biometric information is collected directly from the individual at remote sites to prevent spoofing and identity theft. Third, a distributed, hierarchical database is implemented, and collected information for different individuals is pushed to the lowest level of the database consistent with each individual's mobility history. Storing identification information in local or regional caches, whenever possible, reduces bandwidth requirements, provides retrieval response times on the order of a few seconds, and supports mobility of individuals when they move to different areas of the country. Fourth, a verification procedure is implemented for using biometric data as a retrieval key when it is necessary to verify a person's identity. Fifth, each data collection and verification device is designed to recognize when it is off-net, and to emulate system connectivity when off-net so that the operator of the device can perform the same actions on the device regardless of whether the device is connected to the network or not. When off-net, the devices store collected identification data in a secure data lockbox until back on-net again. The data can be retained in the lockbox until the site becomes connected and the data can be uploaded, or until the lockbox is transported to a connected site for data uploading. Sixth, the secure data lockbox can also be used for local identity verification using stored information that has been verified with the central database.

Figure 1:
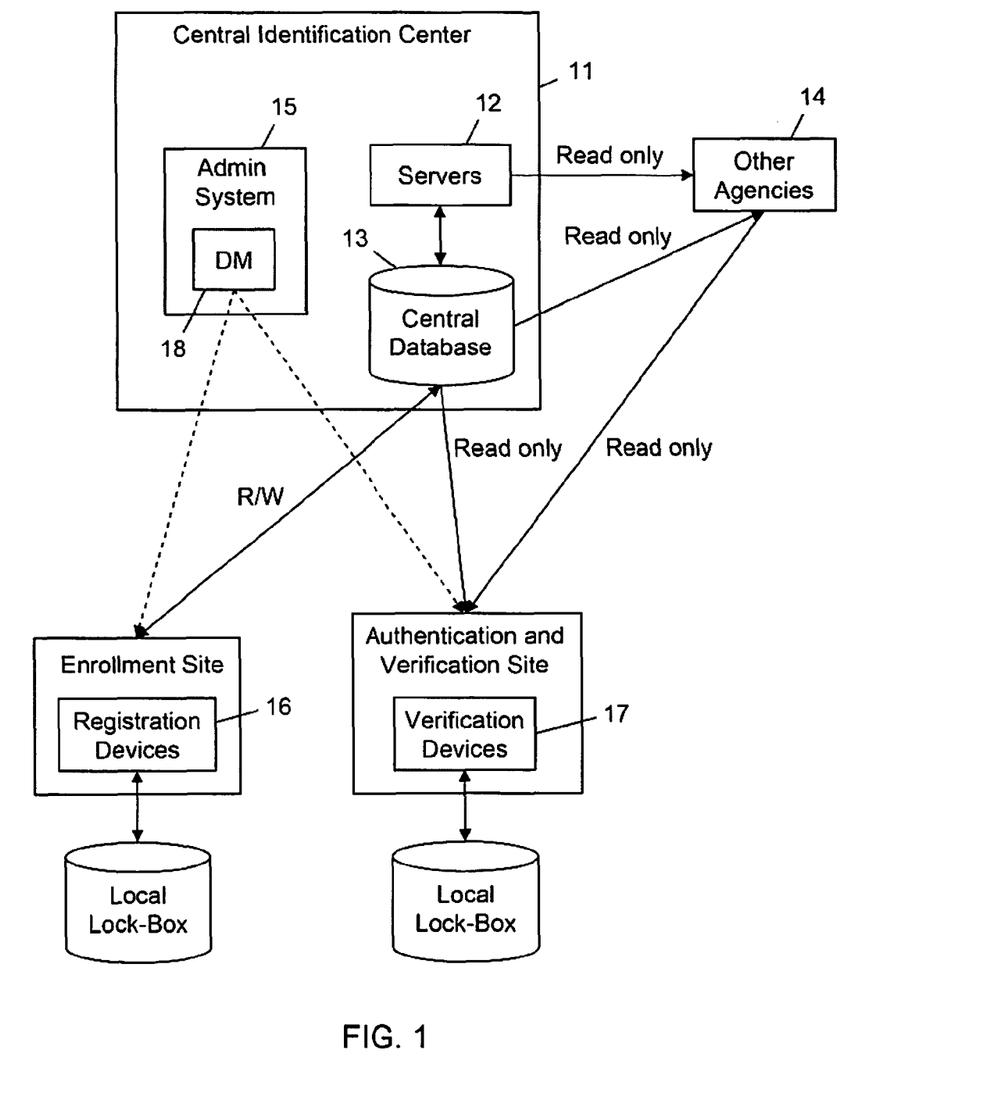
FIG. 1 is a simplified block diagram of an exemplary embodiment of the system of the present invention when utilized in a national identification system.
Figure 2:
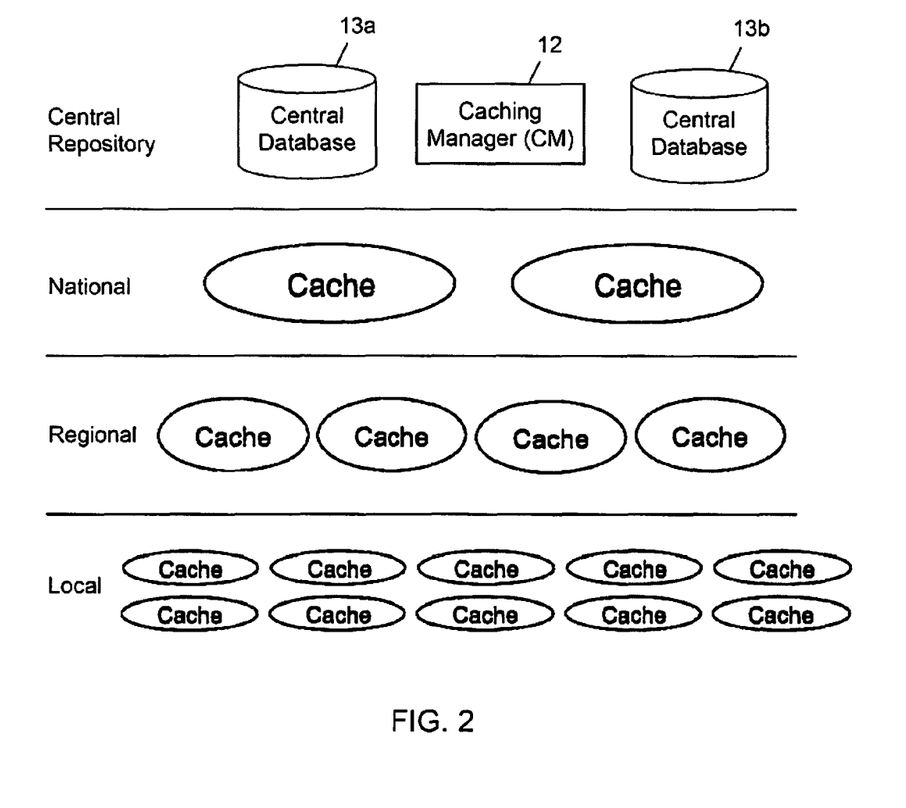
FIG. 2 is a simplified block diagram of a hierarchical distributed database system in an exemplary embodiment of the present invention.

FIG. 1 is a simplified block diagram of an exemplary embodiment of the system of the present invention when utilized in a national identification system. A central identification center 11 includes a plurality of servers 12 having processors executing computer program instructions. The servers interface with a central database 13 in order to securely store and retrieve biometric and demographic information collected from citizens. The central database is a repository for the biometric and demographic data which is then downloaded to regional and local repositories, as shown in FIG. 2. It should be noted that for the purposes of simplifying this description, the central database appears monolithic. In reality, the database may be geographically distributed and redundant with the appropriate failover mechanisms in case of system or communication failures. The central database is sized to store several hundred terabytes of data. The servers may also interface with other external agencies 14 that utilize the UID database.

The enrollment or registration process includes initial data collection and tagging. The biometric information (for example, iris or retina scans, blood samples for DNA mapping, and the like) is captured on a user registration device. Sufficient data must be collected to ensure uniqueness on an individual basis. This volume of data would be different from that needed, for example, for access to health data such as medical images. Other information such as the individual's name, current address, and so on is entered with the biometric information. The information is then submitted to the central repository, and a unique identifier is subsequently assigned to the individual.

The central identification center 11 also includes an administration system 15 for provisioning authorized equipment such as client registration devices 16 at enrollment/data capture sites and client verification devices 17 at authentication and verification sites of the system. A Device Manager (DM) 18 is utilized to protect the integrity of the system by controlling equipment and client device authorizations and monitoring equipment and client device identities to detect duplicate use of the same identities at different locations (cloning attack). Authorization may exist on multiple levels such as, for example, identities of the equipment types that have been certified for the system; identities of specific pieces of equipment that are certified for enrollment, verification, or both; identities of stolen equipment and client devices; identities of licensed client devices; and indications of client devices that are currently licensed for enrollment, verification, or both. Authorization for particular pieces of equipment or client devices may also be limited to particular sites where they are authorized to access the system.

The client registration devices 16 and client verification devices 17 may communicate with the central identification center 11 via any suitable communication protocols and transmission media. For example, a multi-service wired or wireless Wide Area Network/Local Area Network (WAN/LAN) may be set up via land lines, cellular radio connections, microwave radio connections, satellite links, or the like. The entire system may operate utilizing an IP Multimedia Subsystem (IMS) and 3GPP mobile network infrastructure enabling identification services with scalability and nationwide and international access as needed, even when client registration devices 16 and client verification devices 17 travel to remote locations.

Interfaces for each type of equipment and client device may be described in an Interface Control Document (ICD). Manufacturers then design their terminals (hardware/software/client) against the ICD and submit the terminals for type certification by a third party. Upon certification, the equipment type is registered as having passed certification.

Upon sale or other provisioning, each piece of equipment and client device is issued a unique and encrypted key. This key is registered centrally with the DM 18. The DM may blacklist the equipment, the client device, or both in the event of theft to prevent unauthorized disclosure or use of the citizens' identification information.

FIG. 2 is a simplified block diagram of a hierarchical distributed database system in an exemplary embodiment of the present invention. The database system may be implemented on several levels including a central repository level 21, a national level 22, a regional level 23, and a local level 24. The central repository level includes the central database 13, which is shown as multiple databases (DBs) 13a and 13b to indicate that the central database may be distributed to provide geographical redundancy. The central database stores the master copy of each individual's biometric data and other data such as a unique personal identifier, the individual's physical address, past addresses, length of time at each address, and the like.

A Caching Manager (CM) 25 is responsible for determining the most appropriate level to cache an individual's biometric data. The CM balances response time, the movement of individuals to different local or regional addresses, and the optimization of network resources. The CM decides where to cache an individual's biometric data based at least in part on that individual's movement history. For example, if an individual rarely moves from an area served by a local cache, then the data should be stored at the local level 24, thus reducing response time and the amount of data traveling over the network. If the individual moves frequently between local areas within a particular region, then the data may be cached at the regional level 23. Data for an individual who has moved between regions may be cached at the national level 22.

After the individual has remained at a particular location for a predefined period of time, data cached at a higher level may be transferred to a lower level to increase efficiency. For example, an individual may have a history of moving every few years, usually within a given region, but his latest move was to a new region. As a consequence of his latest move, the CM 25 may move his data to the national level 22. After the individual remains in the same location for the defined time period, for example two years, the CM 25 may move the individual's data to the regional level 23 or local level 24. If the data is moved to the regional level, the CM may wait until a second predefined time period has expired and then move the data to the local level.

All of this decision-making may be overridden by other demographic information entered at the time of the individual's moves. For example, all of the individual's early moves within the single region may have been job related. When the individual moves to the new region, he enters an indication that he is retiring and moving to a retirement home. Alternatively, the CM 25 may note that the individual is at retirement age and conclude that the move is for retirement purposes. In either case, the CM may transfer the individual's data to his new local cache since the move is likely to be permanent.

Figure 3:
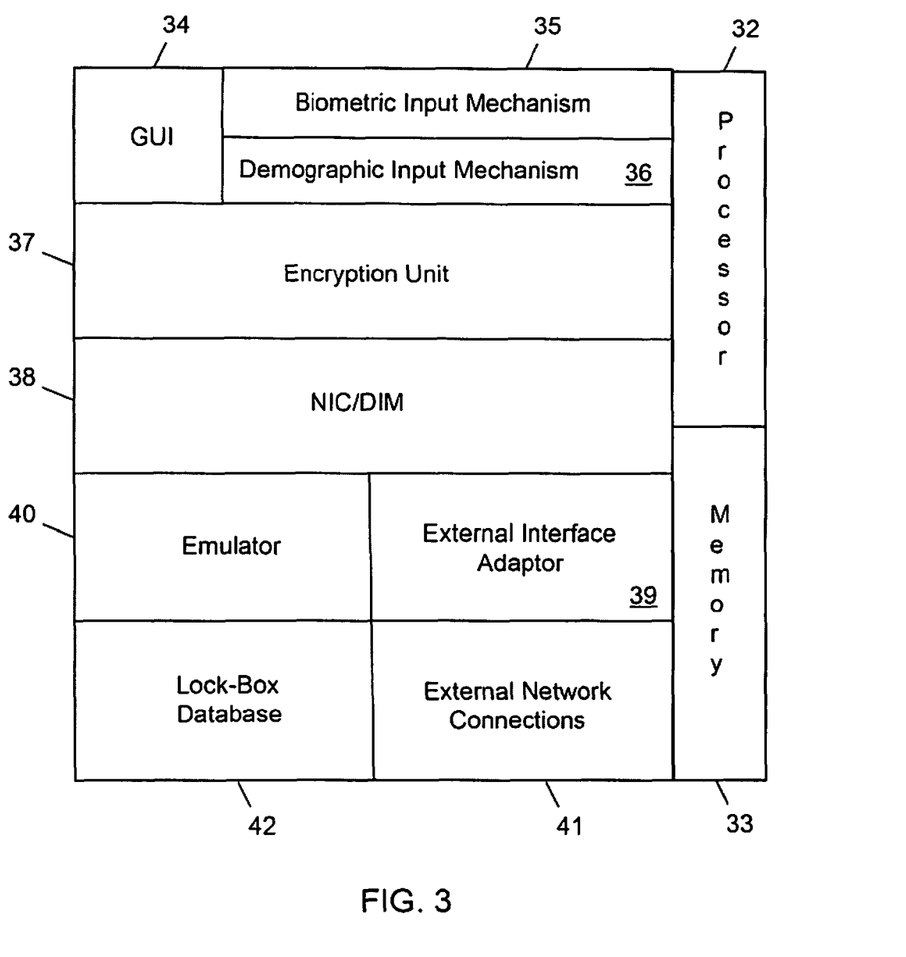
FIG. 3 is a simplified block diagram of an exemplary embodiment of a client registration device.

FIG. 3 is a simplified block diagram of an exemplary embodiment of a client registration device 16. The device may be a handheld device similar to a Personal Digital Assistant (PDA) or other portable device such as a laptop or notebook computer or iPad. The device may operate under the control of a processor 32 executing computer program instructions stored on a memory 33. A Graphical User Interface (GUI) 34 provides graphically driven menu functions enabling an operator of the device to collect, store, and upload or download data. The operator may select a biometric data collection mechanism 35 such as a camera for photographing the individual, an iris scanner for scanning the individual's eye, a fingerprint reader, a facial recognition unit, a DNA sampler, and the like to collect each individual's biometric data. The biometric data collection mechanism may be an external device connected to the registration client device or a built-in sensor. The operator may also select a demographic data collection mechanism 36 such as a keyboard, mouse, audio input, video input, and the like to collect each individual's demographic data.

An encryption unit 37 encrypts all collected or stored data utilizing an encryption technique such as, for example, the Advanced Encryption Standard (AES), RSA encryption, and the like. A network interface controller and device integrity manager (NIC/DIM) 38 controls the device's access to both an external networks interface adapter 39 and a network emulator 40. The NIC/DIM inter-works with functions in a connected external network to ensure that only authorized devices can access the system. This component includes one or more tamper-proof equipment identities or keys, which may be on the client level, the device level, or both. Client level in this regard refers to software that can be ported on any device with characteristics suitable to support a client (for example a SIP IMS client on a windows enabled device). Device level implies a solution in which encryption is embedded in a custom device. While this may be a better solution than a client level solution in some aspects, a device level solution may not be economical in some cases since the solution is custom built, thereby limiting design choices. For high security devices, however, device level encryption may be preferred.

The NIC/DIM 38 has knowledge regarding the availability of the connected external communication network. Based on the availability or lack of availability of the external communication network, the NIC/DIM passes the collected information to either the external networks interface adapter 39 or the network emulator 40.

When the external communication network is available, the external networks interface adapter 39 passes collected data to external network connections 41. In one embodiment, the interface and protocol stack utilized for the connection may be Secure Real-time Transport Protocol (SRTP) over a SIP-based media stream, running over a transport network protocol based on 3GPP standards such as packet data over GPRS, 3G standards, LTE standards, and the like. Alternatively, the transport network may include WiFi (802.11), WIMAX, or a number of other variants.

In remote areas without wired or wireless connections to the Internet, the client registration device 16 may emulate a network connection. A network emulator 40 provides the same "look and feel" for the device operator whether or not the client registration device 16 is connected to an external communication network. The emulator utilizes the same authentication and encryption algorithms to store the relevant enrollment information in a local "lock-box" database 42. The network emulator presents a similar interface to the applications above it so that it appears that the collected information is being transmitted to the network when in fact it is being stored in the device's lock-box. A device display may indicate to the operator that the information is being locally stored. Once the information is stored in the lock-box, the registration device may be physically transported to an access point where IP connectivity is available. When the NIC/DIM 38 detects that the external network is once again available, the NIC/DIM extracts the stored information from the lockbox and transmits the data to the external network.

Thus, the lock-box essentially functions as a long-term transmit buffer, although of large enough size to store the collected information of, for example, several hundred individuals during the time period that the external network is not available. The lock-box may be configured on a replaceable medium such as an encrypted external memory or other medium, which can be replaced if it fills up before the external network becomes available again.

Figure 4:
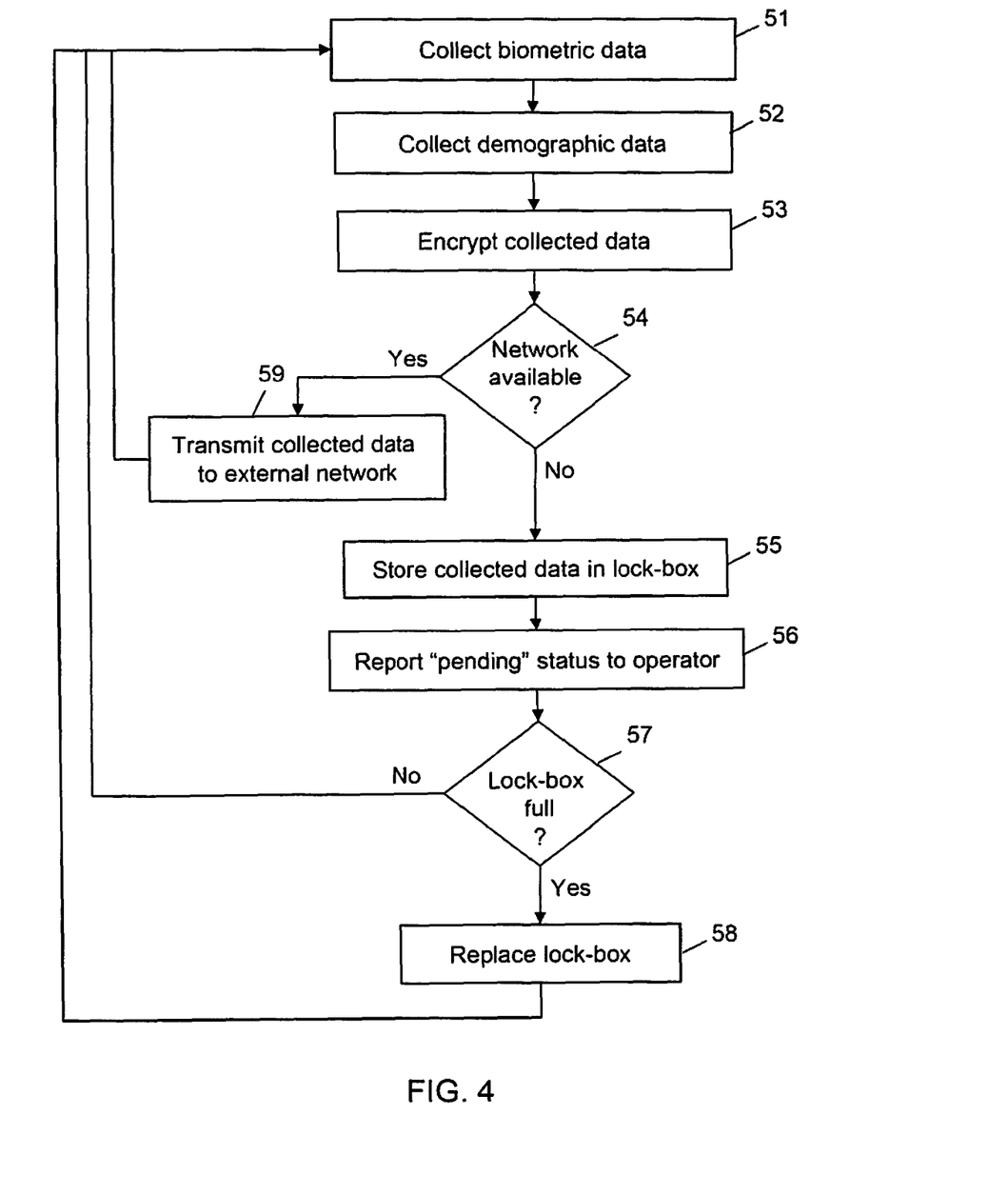
FIG. 4 is a flow chart illustrating the steps of an exemplary embodiment of a method of collecting registration data from an individual.

FIG. 4 is a flow chart illustrating the steps of an exemplary embodiment of a method of collecting registration data from an individual. At step 51, the operator of the client registration device 16 selects the biometric data collection mechanism 35, which collects biometric data on an individual registering with the system. The biometric data may include at least one of: fingerprints, an iris scan, a DNA sample, and one or more photographs of the individual from different directions, including a facial photograph suitable for facial recognition systems. Sufficient data is collected to uniquely identify the individual. At step 52, the operator selects the demographic data collection mechanism 36, which collects demographic data (name, age, gender, currently address, past addresses, etc.) on the individual registering with the system. At step 53, the encryption unit 37 encrypts the individual's collected data.

At step 54, the NIC/DIM 38 determines whether an external communication network is available. If not, the method moves to step 55 where the collected data is stored in the lock-box database 42. At step 56, the device may provide the operator with an indication that the registration process is in a "pending" status. The method then moves to step 57 where it is determined whether the lock-box is full. If not, the method returns to step 51 where the registration process is repeated for another individual. If the lock-box is full at step 57, the method moves to step 58 where the operator replaces the lock-box. The method then returns to step 51 where the registration process is repeated for another individual. When the method reaches step 54 and determines that the network is available, the method moves to step 59 and transmits collected data to the external network along with identifiers for the client device and operator for delivery to the central identification center 11. The method then returns to step 51 where the registration process is repeated for another individual.

The system may periodically update an individual's registration information. For example, when a child is born, the child's parents may take the baby to an enrollment center to obtain an identification card for the baby. Within a few years, however, this information will require updating since the baby has grown into a child. Adult information will also need updating since their appearance may change over time. Likewise, when an individual permanently moves out of the country or dies, the individual's information may be updated with relevant information, archived, or deleted from the database.

Figure 5:
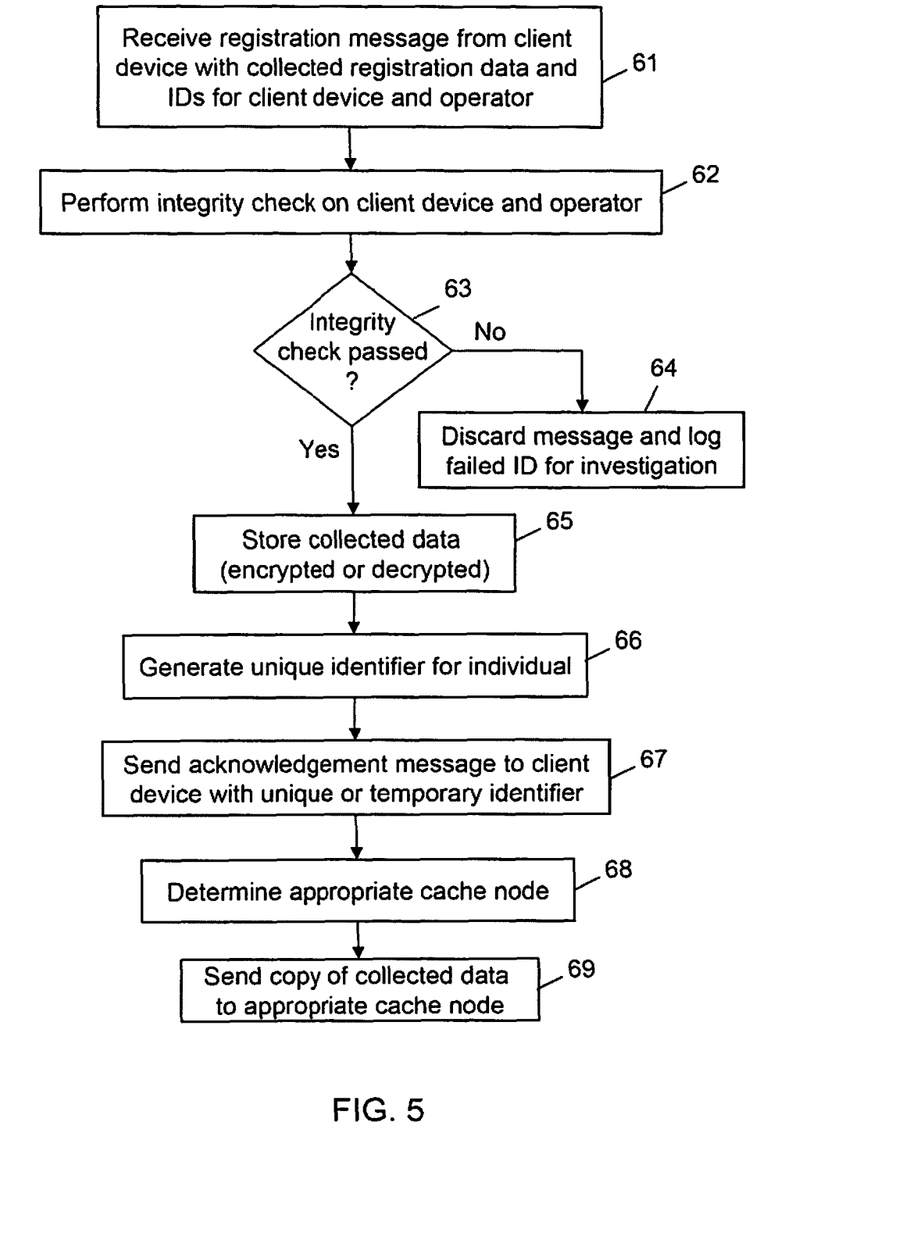
FIG. 5 is a flow chart illustrating the steps of an exemplary embodiment of a method at the central identification center for receiving and caching registration data received from the client registration device of FIG. 4.

FIG. 5 is a flow chart illustrating the steps of an exemplary embodiment of a method at the central identification center 11 for receiving and caching registration data received from the client registration device 16 of FIG. 4. At step 61, the central identification center receives a registration message with the encrypted registration data and identifiers for the client device and device operator. At step 62, the central identification center performs an integrity check on the client device to determine whether the client device and/or the device operator is still authorized to send or receive data. At step 63, it is determined whether the integrity check was passed. If either the client device or the device operator did not pass, the method moves to step 64 where the message is discarded. The identifier of the failed device or operator may be logged for further investigation.

At step 65, the central identification center 11 stores the received data in the central database 13. The data may be stored in its received encrypted form, or may be decrypted and stored unencrypted, or may be decrypted and then re-encrypted using a different encryption method or key. At step 66, the central identification center generates an identifier uniquely associated with the individual whose biometric and demographic data has been stored. This identifier when used as an input to a hashing or other function points to the individual's data. Such types of hashing functions are well known and need not be described further here.

At step 67, an acknowledgement message is sent to the client device or other local equipment to confirm the registration process. The acknowledgment message includes the unique identifier (UIN) or, alternatively, a temporary identifier for use while other back-office processes in the central identification center record the permanent identifier. Sending the identifier enables the client device or local equipment to print a permanent or temporary identity card including the individual's identifier and preferably a photograph of the individual. At step 68, the Caching Manager (CM) 25 determines which cache node is the most appropriate for the initial storage of the cached biometric and associated data based on a number of factors. In one embodiment, the CM determines which cache node is the most appropriate based on the location where the individual currently lives and historical mobility information collected from the individual. For example, if the individual has always lived in a particular location, or has lived in that location for more than a threshold number of years (e.g., five years), the CM may select a local cache node for that location. If the individual has lived in the location for less than the threshold number of years, and previously lived within the same region, the CM may select an associated regional cache node. If the individual has recently moved from another region, the CM may select the national cache node. The CM may also create a history for the individual, which the CM can analyze to identify patterns of temporary mobility verses long-term relocation. The CM may utilize these patterns to make present or future decisions regarding the optimal placement of the data. At step 69, sending the data to the appropriate caching node completes the receiving and storing method.

In another embodiment, the CM 25 may also, or alternatively, determine which cache node is the most appropriate based on business information collected from the individual. The business information indicates which types of transactions the individual is likely to perform with the database, and different types of transactions may weigh in favor of caching at different levels in the database. For example, a local cache node may be selected when the business information indicates the individual is likely to perform transactions of a low security type such as routine transactions with the individual's bank. On the other hand, a regional or national cache node may be selected when the business information indicates the individual is likely to perform transactions of a high security type such as accessing classified national security information.

Periodically, the CM 25 reassesses the individual's cache node and if warranted, moves the individual's data to a more appropriate level. For example, when the initial selection was made, the individual may have lived in his current location for less than the threshold number of years, causing the CM to store his data at a regional cache node. Upon reassessment, the individual may have lived in his current location for more than the threshold number of years, enabling the CM to move his data to the local cache node.

Figure 6:
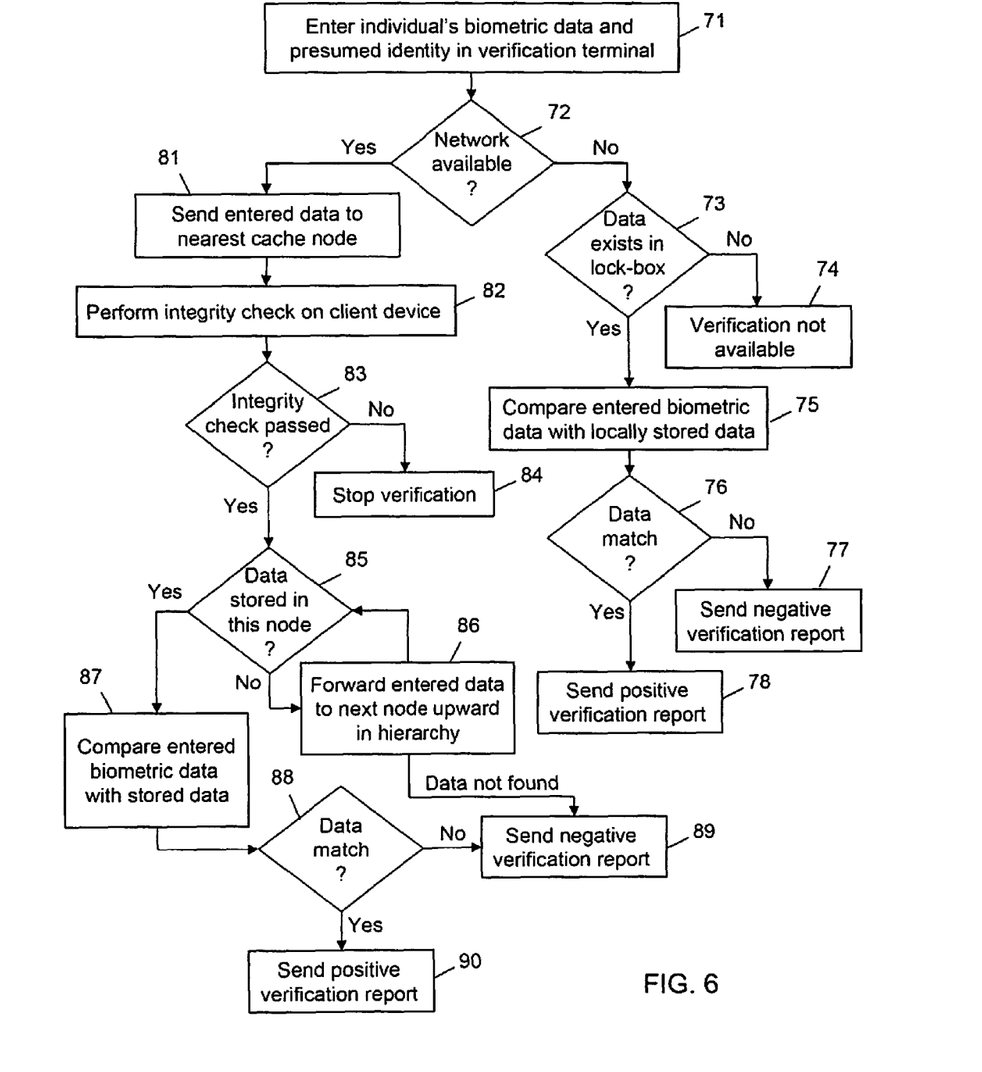
FIG. 6 is a flow chart illustrating the steps of an exemplary embodiment of a method of verifying a registered individual's identity.

FIG. 6 is a flow chart illustrating the steps of an exemplary embodiment of a method of verifying a registered individual's identity. It is understood that in many cases, informal verifications will not result in the download or upload of full biometric data (or any data at all), since visual inspection of the individual's photo-identity card is likely to suffice. In other cases, however, more thorough verifications may be required. A typical case may be, for example, where the individual's photo-identity card is thought to be a forgery, or when extra security precautions are needed such as at political events, public safety incidents, and the like. In these cases, the data transfer requirements are more intensive.

To allow scalability of the system, the central database 13 is not used for verifications. Instead, the interaction with the system is done at the level of the national, regional, or local caching node(s). At step 71, the individual's biometric information and presumed identity are entered in a client verification device 17 for authentication and verification. The presumed identity may be entered by scanning an identity number on the individual's photo-identity card. The client device may reject a poor quality forgery at this point if the scanning is not successful or if other security features on the card are not present or are incorrect. At step 72, it is determined whether the network is available. If not, the method moves to step 73 where the client device determines whether identification data for the individual is stored in the local lock-box. It should be noted that in some circumstances, for example in remote areas without network connectivity, it may be desirable to utilize locally cached data stored in the verification device's lock-box for verifications when the network is not available. This can be done, provided that the individual's identification data has been previously uploaded to the central database 13 where a unique UIN has been assigned and transmitted to the verification device. If the individual's data is not stored in the local lock-box, the method moves to step 74 and informs the device operator that verification is not available for this individual at this time. However, if the individual's data is stored in the local lock-box, the method moves to step 75 where the entered biometric data is compared with the locally stored data. At step 76, it is determined whether the data match. If not, the client device provides the operator with a negative verification report at step 77. If the data match, the client device provides the operator with a positive verification report at step 78. The verification report may include an indication of whether the verification was performed internally in the client verification device or externally by one of the network cache nodes.

At step 72, it may alternatively be determined that the network is available. If so, the method moves to step 81 where the client device sends the individual's entered biometric data to the nearest cache node. This may be a cache node at the local level. At step 82, the cache node performs an integrity check on the client device. This step may involve exchanging messages with the central identification center 11, particularly with the Device Manager (DM) 18 (FIG. 1) to verify that the client device is an authorized device. At step 83, it is determined whether the client device passed the integrity check. If not, the method moves to step 84 where the verification processing is stopped. However, if the client device passed the integrity check, the method moves instead to step 85 where the cache node determines whether the individual's data is stored in this cache node. If not, the cache node forwards the individual's data to the next cache node upward in the database hierarchy. This process continues upward through regional cache nodes to a national cache node if the individual's data is not found at a lower level. Of course, if the individual's data is not found on any level, including the central database, a negative verification report is generated at step 89.

When the individual's data is found at step 85, the method moves to step 87 where the entered biometric data is compared with the stored data. At step 88, it is determined whether the data match. If not, the method moves to step 89 where the verifying cache node sends a negative verification report to the client device. If the data match, the verifying cache node sends a positive verification report to the client device at step 90.

The system may also perform procedures to detect and prevent unauthorized accesses. For example, the central identification center 11 or a dedicated monitoring facility may maintain statistics of data accesses by all or a number of authorized client registration devices, and may develop statistical norms for accesses from such authorized devices. For example, client registration devices having identities or serial numbers within a given range may be authorized to access the system only from certain locations or at certain times. The facility may then detect a potentially unauthorized access from a client registration device by detecting an access attempt that deviates from the statistical norms.

The system may also perform procedures to detect and prevent intentional or unintentional system abuse. For example, the central identification center 11 or the dedicated monitoring facility may monitor registrations, modifications, and readings of biometric information from all or a number of individuals. The registrations, modifications, and readings may be compared with a set of rules governing authorized registrations, modifications, and readings. An intentional or unintentional abuse of the registration process may be declared when a monitored registration, modification, or reading does not comply with the rules.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of handling personal identification information, the method comprising the steps of:
   collecting by a client registration device, a sufficient amount of biometric information directly from an individual to uniquely identify the individual;
   collecting by the client registration device, historical mobility information from the individual, the mobility information providing a history of locations where the individual has lived; and
   storing the collected biometric information at a selected cache node in a hierarchical database having a plurality of cache nodes at multiple levels of the database, wherein the storing step includes selecting the cache node based on the historical mobility information collected from the individual.

2. The method as recited in claim 1, wherein the step of collecting historical mobility information also includes collecting information regarding the period of time the individual lived in each location in the history of locations where the individual has lived.

3. The method as recited in claim 2, further comprising, after collecting the historical mobility information, the step of analyzing the historical mobility information to identify patterns of temporary mobility verses long-term relocation, wherein the step of selecting the cache node includes selecting the cache node based on the identified patterns.

4. The method as recited in claim 1, wherein the step of selecting the cache node includes selecting a local cache node at a local level of the database when the historical mobility information collected from the individual indicates that the individual has lived in an associated local area for more than a threshold period of time.

5. The method as recited in claim 4, wherein the step of selecting the cache node also includes selecting a regional cache node associated with a plurality of locations when the historical mobility information collected from the individual indicates that the individual has lived in an associated local area for less than the threshold period of time.

6. The method as recited in claim 5, further comprising the steps of:
transmitting the collected biometric information from the client registration device to a central identification center;
storing the collected biometric information in a central database;
associating a unique identification number with the stored biometric information; and
transmitting the unique identification number from the central identification center to the client registration device.

7. The method as recited in claim 6, further comprising the steps of:
receiving by a client verification device, a verification request to verify the identity of an unverified individual, the request including the unverified individual's unique identification number and new biometric information collected from the individual;
sending the verification request from the client verification device to the local cache node;
verifying by the local cache node that the client verification device is an authorized device;
determining whether the individual's stored biometric information is stored in the local cache node;
when the individual's stored biometric information is stored in the local cache node, comparing the new biometric information with the biometric information stored in the local cache node and providing to the client verification device, a positive verification of the individual's identity when the new biometric information matches the stored biometric information;
when the individual's stored biometric information is not stored in the local cache node, forwarding the verification request from the local cache node to the regional cache node; and
comparing the new biometric information with the biometric information stored in the regional cache node and providing to the client verification device, a positive verification of the individual's identity when the new biometric information matches the stored biometric information.

8. The method as recited in claim 1, further comprising the steps of:
determining by the client registration device, whether the client registration device is connected to a communication network at the time of collecting the biometric information from the individual;
when the client registration device is not connected to a communication network, storing the collected biometric information in a locally accessible lock-box database until a network connection is restored; and
upon restoration of the network connection:
transmitting the collected biometric information from the client registration device o a central identification center;
storing the collected biometric information in a central database;
sending a copy of the biometric information to the selected cache node;
associating a unique identification number with the stored biometric information; and
transmitting the unique identification number from the central identification center to the client registration device.

9. The method as recited in claim 1, wherein the step of collecting a sufficient amount of biometric information includes collecting a photographic image of the individual and at least one of:
the individual's fingerprints;
an iris scan of the individual's eye; and
a DNA sample from the individual.

10. The method as recited in claim 1, further comprising collecting by the client registration device, business information from the individual, wherein the business information indicates types of transactions the individual is likely to perform with the database, and the step of selecting the cache node includes:
selecting a local cache node at a local level of the database when the business information indicates the individual is likely to perform routing transactions of a low security type; and
selecting a regional cache node associated with a plurality of locations when the business information indicates the individual is likely to perform transactions of a high security type.

11. The method as recited in claim 1, further comprising the steps of:
transmitting the collected biometric information from the client registration device to a monitoring facility;
maintaining by the monitoring facility, statistical norms of data accesses by a plurality of authorized client registration devices; and
detecting by the monitoring facility, a potentially unauthorized access from a client registration device by detecting an access attempt that deviates from the statistical norms.

12. The method as recited in claim 1, further comprising the steps of:
transmitting the collected biometric information from the client registration device to a monitoring facility;
monitoring by the monitoring facility, registrations of biometric information from a plurality of individuals, modifications of the registered biometric information, and readings of the registered biometric information;
comparing the registrations, modifications, and readings with a set of rules governing authorized registrations, modifications, and readings; and
detecting by the monitoring facility, intentional or unintentional abuse of the registration process when a monitored registration, modification, or reading does not comply with the rules.

13. A system for handling personal identification information, the system comprising:
a client registration device comprising a processor coupled to a memory that stores computer program instructions, wherein when the processor executes the computer program instructions, the client registration device is caused to:

collect through a biometric data input mechanism, a sufficient amount of biometric information directly from an individual to uniquely identify the individual; and collect through a demographic data input mechanism, historical mobility information from the individual, the mobility information providing a history of locations where the individual has lived; and a caching manager configured to store the collected biometric information at a selected cache node in a hierarchical database having a plurality of cache nodes at multiple levels of the database, wherein the caching manager is configured to select the cache node based on the historical mobility information collected from the individual.

14. The system as recited in claim 13, wherein the client registration device is configured to collect through the demographic data input mechanism, information regarding a period of time the individual lived in each location in the history of locations where the individual has lived.

15. The system as recited in claim 14, wherein the caching manager is further configured to analyze the historical mobility information to identify patterns of temporary mobility verses long-term relocation, wherein the caching manager is configured to select the cache node based on the identified patterns.

16. The system as recited in claim 13, wherein the caching manager is configured to select a local cache node at a local level of the database when the historical mobility information collected from the individual indicates that the individual has lived in an associated local area for more than a threshold period of time.

17. The system as recited in claim 16, wherein the caching manager is configured to select a regional cache node associated with a plurality of locations when the historical mobility information collected from the individual indicates that the individual has lived in an associated local area for less than the threshold period of time.

18. The system as recited in claim 13, wherein the biometric data input mechanism includes a camera for obtaining a photographic image of the individual, and also includes at least one of:
a fingerprint reader;
an iris scanner; and
a DNA sampler.

19. The system as recited in claim 13, wherein the client registration device also includes a transmitter for transmitting the collected biometric and demographic information over a wired or wireless connection to a central identification center, the central identification center including:
a central database configured to store the collected biometric information and to send a copy of the biometric information to the selected cache node; and
a transmitter configured to transmit a unique identification number associated with the stored biometric information over a wired or wireless connection to the client registration device;
wherein the central identification center is configured to send the demographic information to the caching manager.

20. The system as recited in claim 13, further comprising a client verification device, wherein the client verification device is configured to:
receive through an input mechanism, the unique identification number of an unverified individual;
collect through a biometric data input mechanism, new biometric information from the unverified individual;
transmit the unique identification number and new biometric information over a wired or wireless connection to a local cache node with a verification request to verify the identity of the unverified individual; and
receive a positive or negative verification report.

* * * * *

UNITED STATES PATENT AND TRADEMARK OFFICE
CERTIFICATE OF CORRECTION

| | | |
|---|---|---|
| PATENT NO. | : 8,458,779 B2 | Page 1 of 1 |
| APPLICATION NO. | : 12/819623 | |
| DATED | : June 4, 2013 | |
| INVENTOR(S) | : Valentine et al. | |

It is certified that error appears in the above-identified patent and that said Letters Patent is hereby corrected as shown below:

In the Claims:

Column 12, Line 2, Claim 8, delete "o a" and insert -- to a --, therefor.

Signed and Sealed this
Twenty-second Day of October, 2013

Teresa Stanek Rea
*Deputy Director of the United States Patent and Trademark Office*